US008689023B2

(12) United States Patent
Gupta et al.

(10) Patent No.: US 8,689,023 B2
(45) Date of Patent: Apr. 1, 2014

(54) DIGITAL LOGIC CONTROLLER FOR REGULATING VOLTAGE OF A SYSTEM ON CHIP

(75) Inventors: Sunny Gupta, Noida (IN); Kumar Abhishek, Ghaziabad (IN); Garima Sharda, Ghaziabad (IN); Samaksh Sinha, New Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 270 days.

(21) Appl. No.: 13/275,310

(22) Filed: Oct. 17, 2011

(65) Prior Publication Data

US 2013/0093505 A1 Apr. 18, 2013

(51) Int. Cl.
*G06F 1/00* (2006.01)

(52) U.S. Cl.
USPC .......... 713/300

(58) Field of Classification Search
USPC .......... 713/300
See application file for complete search history.

(56) References Cited

U.S. PATENT DOCUMENTS 4,546,326 A * 10/1985 Van Uffelen et al. ......... 330/129
5,300,824 A 4/1994 Iyengar
6,762,629 B2 * 7/2004 Tam et al. .......... 327/114
7,085,943 B2 8/2006 Chun
7,642,764 B2 1/2010 Burton
7,811,917 B2 * 10/2010 Marshall .......... 438/578
7,890,781 B2 * 2/2011 Gunther et al. .......... 713/300
2005/0210346 A1 9/2005 Comaschi
2005/0218871 A1 10/2005 Kang
2007/0216376 A1 * 9/2007 Ogawa .......... 323/236
2010/0165585 A1 7/2010 Lin
2013/0086396 A1 * 4/2013 Liu .......... 713/300

OTHER PUBLICATIONS

"Chip Performance Regulator Using On Chip Voltage Controlled Oscillator"; Dec. 1, 1980; IBM Technical Disclosure Bulletin, vol. 23, Issue 7A, pp. 2631-2632.*

* cited by examiner

*Primary Examiner* — Thomas Lee
*Assistant Examiner* — Gayathri Sampath
(74) *Attorney, Agent, or Firm* — Charles Bergere

(57) ABSTRACT

A digital logic controller for regulating a voltage of a SoC includes a first input for receiving a reference signal having a first property that is constant over a range of operating conditions of the SoC, and a second input for receiving a second signal that has a second property that is indicative of an operating condition of the SoC. The second property may vary over a range of operating conditions of the SoC. A comparator compares the first and second properties and the digital logic controller, based on the comparison, outputs to a regulation signal to a voltage regulator to regulate the voltage of the SoC at or near a target voltage that is higher than a minimum operating voltage of the SoC.

20 Claims, 3 Drawing Sheets

DIGITAL LOGIC CONTROLLER FOR REGULATING VOLTAGE OF A SYSTEM ON CHIP

BACKGROUND OF THE INVENTION

The present invention relates to an on-chip voltage regulator and, more particularly, to a System on Chip (SoC) having on-chip voltage regulation and a digital logic controller for regulating the voltage of a SoC.

Conventionally, SoCs are designed to cater for worst-case timing performance. Generally speaking, a SoC works faster during higher voltage and lower ambient temperature conditions. Lower voltage and/or higher temperature necessarily results in a slower operation of the SoC. This means that the SoC must be designed to ensure that the timing of the critical paths must be met at reduced voltage and/or increased temperature conditions to ensure adequate operation of the SoC. The SoC designer must take due consideration of the PVT (process, voltage, temperature) corners; process variations must also be considered because due to small variations during manufacturing, two chips can have slightly different characteristics, meaning that they operate at slightly different speeds when compared with one another under the same conditions for voltage and temperature.

However, during the majority of the operational time of the SoC, the SoC operates in better than the worst-case conditions in terms of the three parameters: process, voltage and temperature. Therefore, in such conditions the critical path of the SoC will have sufficient positive slack, meaning that the SoC is running in excess of its worst-case performance requirement. In such circumstances, SoC voltage is higher than necessary and the excess performance can be considered to correspond to excess consumed power. This is particularly wasteful given that the dynamic power is proportional to voltage, more precisely to the square of the voltage.

For instance, a specific application for the SoC, e.g., an automotive application, might require a worst-case operating scenario where the SoC must operate at a target frequency of 200 MHz. However, the prevailing environmental conditions are usually better, perhaps much better, than the worst-case scenario. In these circumstances, the SoC is capable of operating at a higher frequency if operating at a higher voltage and/or a lower ambient temperature or manufactured in a faster process corner. However, since the minimum guaranteed operating frequency is only 200 MHz (which must be met at all times), capacity is wasted.

Dynamic Voltage Scaling (DVS) is a voltage regulation feedback system used to control supply voltage dynamically according to performance requirements. DVS is particularly beneficial in mobile applications where electrical and electronic components are powered by a battery, across a broad range of technologies from mobile computing (including mobile communications devices) to, for example, automotive applications. By exploiting the variations associated with different computational requirements for a device such as a SoC at different times in its operational cycle, the average energy of the device can be reduced while maintaining acceptable processing capacity. It therefore follows that the battery life can be extended and/or the physical size of the battery can be reduced.

In one known system a hybrid open-loop/closed-loop voltage regulation circuit is implemented. A temperature-insensitive value of a ring oscillator is used to index a lookup table (LUT). From this, the particular state or mode of operation of the system is identified and the required target frequency is derived, also from the LUT. The target supply voltage for the system is set according to the target frequency for the identified process. Once the voltage settles at the target voltage, the voltage regulation system switches to a closed-loop configuration in which the target frequency is compared to a frequency of a critical path of the system for voltage fine tuning. That is, in the closed-loop configuration fine-tuning is effected to maintain the voltage at the level identified from the LUT.

However, this requires the implementation of LUTs, which is a significant drawback considering the effort required in the compilation of the look up tables, characterization of the electronic device across a broad range of operating conditions, and a wide range of device samples that can easily run into the millions.

Implementation of DVS techniques may be further complicated in zero-defect engineering applications, such as in the automotive industry. This is because automotive customers require close to 0 PPM failure rate. One must have close controllability of voltages and implement hard thresholds for voltage conditions that are required for correct functioning.

Thus, it would be advantageous to develop one or more new techniques that alleviate the aforementioned problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE INVENTION

Figure 1:
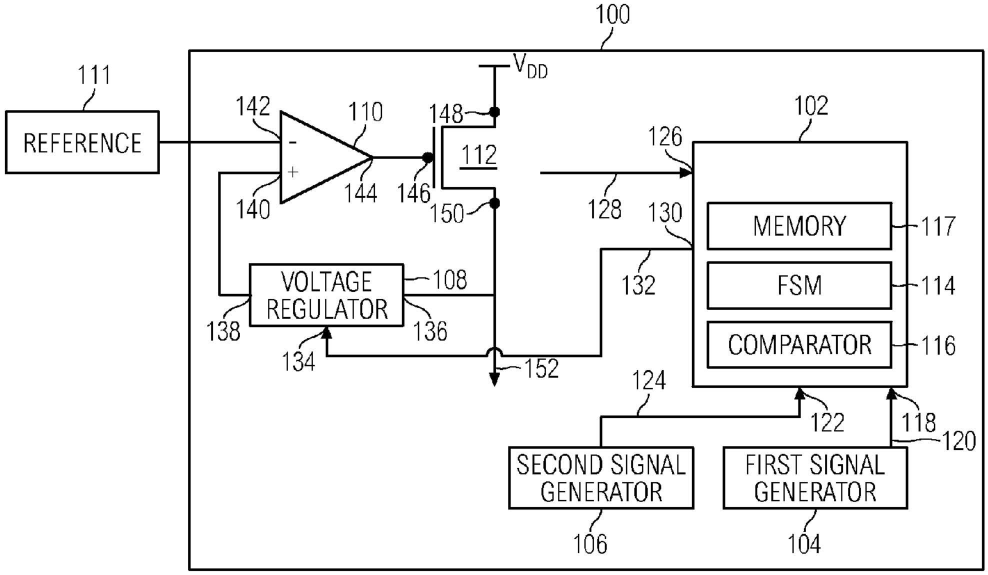
FIG. 1 is an electrical schematic diagram illustrating on-chip voltage regulation in a system on chip with a digital logic controller in accordance with an embodiment of the present invention.

In one embodiment of the invention there is provided a digital logic controller for regulating a voltage of a system on chip, the digital logic controller comprising: a first input for receiving a first signal, the first signal being a reference signal and having a first property which is at least substantially constant over a range of operating conditions of the system on chip; a second input for receiving a second signal, the second signal having a second property which is indicative of an operating condition of the system on chip, the second property being variable over the range of operating conditions (for example, PVT) of the system on chip; an output; and a comparator for comparing the first property of the first signal and the second property of the second signal; wherein in dependence of the comparison, the digital logic controller is configured to output to a voltage regulator, via the output, a regulation signal for regulating the voltage of the system on chip at or near a target voltage a predetermined amount higher than a minimum operating voltage of the system on chip.

In another embodiment of the invention there is provided a system on chip comprising: a first signal generator for generating a first signal, the first signal being a reference signal and having a first property which is at least substantially constant over a range of operating conditions of the system on chip; a second signal generator for generating a second signal having a second property which is indicative of an operating condition of the system on chip, the second property being variable over the range of operating conditions of the system on chip; a voltage regulator; and a digital logic controller comprising: a first input for receiving the first signal; a second input for receiving the second signal; an output; and a comparator for comparing the first property of the first signal and the second property of the second signal; wherein in dependence of the comparison, the digital logic controller is configured to output to the voltage regulator, via the output, a regulation signal for regulating the voltage of the system on chip at or near a target voltage a predetermined amount higher than a minimum operating voltage of the system on chip.

In another embodiment of the invention there is provided a method for regulating a voltage of a system on chip, the method comprising: providing a digital logic controller comprising: a first input; a second input; an output; and a comparator; receiving, at the first input of the digital logic controller, a first signal generated by a first signal generator, the first signal being a reference signal and having a first property which is at least substantially constant over a range of operating conditions of the system on chip; receiving, at the second input of the digital logic controller, a second signal generated by a second signal generator, the second signal having a second property which is indicative of an operating condition of the system on chip, the second property being variable over the range of operating conditions of the system on chip; comparing, using the comparator, the first property of the first signal and the second property of the second signal; and in dependence of the comparison, regulating the voltage of the system on chip at or near a target voltage a predetermined amount higher than a minimum operating voltage of the system on chip by outputting, via the output of the digital logic controller, a regulation signal to a voltage regulator.

Implementation of embodiments of the invention may provide significant technical benefits in comparison with conventional techniques. For instance, implementation of an on-chip voltage regulation technique in which a digital logic controller outputs to a voltage regulator a regulation signal for regulating the voltage of the system on chip, for example, a supply voltage of the system on chip, at or near a target voltage a predetermined amount higher than the minimum operating voltage of the system on chip may obviate the requirement for look up tables and the attendant costs associated therewith. As the voltage of the SoC is regulated dynamically responsive to changing operating conditions, this may dispense with the necessity for the reference settings derived and then stored in the lookup table. Such an on-chip dynamic voltage regulator trim algorithm helps to achieve optimal operating voltage and current consumption "on-the-fly" also leading to a simplified, yet robust, architecture. The switching current of a transistor is proportional to supply voltage. If voltage is reduced, the current consumption of the SoC will also decrease, in an approximately linear relationship to the voltage reduction. Therefore, in the best case, embodiments of the invention may expect a reduction of 20% of the Run mode power (Voltage*Current) if operating voltage reduces by 10%. Further, the invention has particular application for zero-defect engineering environments such as in the automotive industry. The invention is also particularly beneficial in automotive applications because microcontroller units have strict run current requirements due to environmental requirements.

Significant power savings may be realized in embodiments of the invention where the digital logic controller reduces the voltage of the SoC in dependence of determining from the comparison that the SoC is operating in a condition that is better than the poorest acceptable operating condition. In such circumstances, the SoC may be operating at above minimum operating voltage or below maximum operating ambient temperature. As such, the SoC may be operating at a higher frequency than required by the critical path and this excess performance can be traded-off for voltage and power reduction.

In embodiments of the invention where the second signal generator is a ring oscillator, this provides an acceptable approximation of the SoC critical path, especially when implementing the ring oscillator using "building blocks" of the critical path such as NOR and digital logic gates. Therefore, such a ring oscillator provides an acceptable approximation of the actual operation condition of the system on chip, the critical timing path of the design and the maximum speed at which it can operate.

In embodiments of the invention where the digital logic controller is provided with a voltage regulation memory, such as a memory register provided to store a "last value" of the regulation signal (e.g. a last trimming value applied to the voltage regulator, described in further detail below) this allows for particularly efficient operation of the voltage regulation scheme by quickly reaching the optimal point of operation in every subsequent start of algorithm.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to distinguish between the elements such terms describe. Thus, these terms are not necessarily intended to indicate temporal or other prioritization of such elements.

Because the apparatus implementing the present invention is, for the most part, composed of digital and analog circuit components known to those skilled in the art, full details of those components will not be explained in any greater extent than that considered necessary for the understanding and appreciation of the underlying concepts of the present invention and in order not to obfuscate or distract from the teachings of the present invention.

Some of the embodiments may be implemented using a variety of different core components. For example, although embodiments of the invention described herein implement a digital logic controller, the necessary control logic could otherwise be implemented using other computing device components. For instance, the disclosed voltage regulation techniques could be implemented under control of a computer processor operating in conjunction with a memory such as a random access memory, the processor being configured to execute instructions stored in the memory to effect the control functionality. Indeed, such an implementation may make convenient use of components found on the system on chip, including the processor and memory components thereon. As a further alternative, a processor and memory separate from the system on chip could also be used.

Of course, the description of the voltage regulation techniques have been simplified for purposes of discussion, and it is just one of many different types of appropriate hardware implementing voltage regulation algorithms that may be used in accordance with the invention. Those skilled in the art will recognize that the exemplary embodiments are merely illustrative. Moreover, alternative embodiments may include multiple instances of a particular operation, and the order of operations may be altered in various other embodiments.

Referring now to FIG. 1, a first embodiment of the invention implementing on-chip voltage regulation techniques will now be described. FIG. 1 illustrates, in schematic, a system on chip (SoC) 100 comprising, principally: a digital logic controller 102; a first signal generator 104; a second signal generator 106; a voltage regulator 108; a comparator 110 (which may act as an error amplifier) having one input supplied from a reference signal generator 111 (such as a band gap), and a second input supplied from the voltage regulator 108; and a voltage driver 112. In the embodiment of FIG. 1, the voltage driver is a MOSFET, but other voltage drivers such as a BJT can also be used.

In the embodiment of FIG. 1, the digital logic controller 102 implements digital logic circuit components represented by a finite state machine (FSM) 114. Digital logic controller 102 also comprises a comparator 116 (for example, a digital comparator), the operation of which will be described in detail below.

In some embodiments, digital logic controller 102 has a voltage regulation memory 117, such as a memory register, which will also be described in detail below.

Digital logic controller 102 has a number of inputs and outputs for receiving and outputting electrical signals. First input 118 of digital logic controller receives an output signal 120 from first signal generator 104. Second input 122 of digital logic controller 102 receives an output signal 124 from second signal generator 106. Further, digital logic controller 102 has a third input 126 for receiving a low voltage warning signal 128 from an analog circuit (not shown) which compares the output of the voltage driver to a predetermined threshold, and generates the signal to indicate a low voltage warning.

Output 130 of digital logic controller 102 outputs a regulation signal 132 to control input 134 of voltage regulator 108. In at least one embodiment, this regulation signal takes the form of a word signal, for applying the trim settings of the voltage regulator 108, as described in more detail below with reference to FIG. 5 voltage regulator 108 also has input/output terminals 136, 138 for generating the feedback voltage for the comparator 110. In the embodiment of FIG. 1, the voltage which is regulated is the incoming SoC supply voltage, Vdd to provide a regulated voltage 152. This will be discussed in greater detail with reference to FIG. 5.

Terminal 138 of voltage regulator 108 is connected to the non-inverting input 140 of comparator/error amplifier 110. The signal on the inverting input 142 is received from reference generator 111. Comparator 110 provides an output signal, the amplified difference between the input signals on terminals 140, 142, on output terminal 144 which is connected to the gate terminal 146 of voltage driver 112. The source terminal 148 of MOSFET 112 is connected to the input supply voltage Vdd and the voltage supplied on drain terminal 150 is the voltage of the SoC which is regulated by the voltage driver 112.

The regulated voltage 152 is the power supply of components of the SoC, such as the sea of gates thereon (not illustrated).

In the embodiment of FIG. 1, first signal generator 104 is a crystal oscillator. The crystal oscillator is selected to have low clock frequency drift across the range of operating conditions of the SoC 100; thus, this frequency is "substantially constant" across the range. That is, the crystal oscillator is selected so that variations in its supply voltage, derived from Vdd, or frequency have minimal impact on the oscillation frequency of the crystal oscillator. Therefore, the clock frequency of the crystal oscillator 104 is substantially constant over a range of operating conditions of the SoC 100.

The inventors of the invention have found that although oscillation frequencies of the crystal oscillator 104 between 32 kHz and 40 MHz are particularly useful, but other frequencies are contemplated.

In embodiments of the invention, one or more ring oscillators 106 are positioned on the SoC 100 at or near critical circuits thereon, such as the CPU (central processing unit) or the cache memory (neither of which are illustrated for the sake of clarity).

In the embodiment of FIG. 1, the second signal generator 106 is a ring oscillator selected to generate a signal which has a property indicative of an operating condition of the system on chip, this property being variable over the range of operating conditions (PVT). In this embodiment, the property which is variable is the oscillation frequency of the ring oscillator. An exemplary ring oscillator is described in more detail with reference to FIG. 6. Generally speaking, ring oscillators can be designed to be sensitive to variations in supply voltage, process and/or temperature and, as a consequence of this, the oscillation frequency may vary in dependence thereof. In some embodiments of the invention, a standard ring oscillator may be implemented, but the inventors have found that the ring oscillator of FIG. 6 (and variants thereof) is particularly advantageous for reasons which will be clear from the discussion which follows below.

In some embodiments of the invention, a ring oscillator is selected with an oscillation frequency of around 1 GHz. This signal may be subjected to frequency scaling so that it is of a similar order of the oscillation frequency of the crystal oscillator 104. Such an arrangement facilitates a comparison between the two signals. Alternatively, the signal is supplied to digital logic controller 102 unconditioned for the digital logic controller to, if necessary, conditioning (such as by frequency scaling) and processing by comparator 116.

Thus, signal 124 output by second signal generator 106 is derived from a clock signal of a ring oscillator.

Signal 120 is derived from the first clock signal of crystal oscillator 104. That is, signal 120 may be output by first signal generator 104 without further conditioning or it may be conditioned by the digital logic controller or another component of SoC 100.

Signals 120, 124 are input to digital logic controller 102, respectively, on inputs 118, 122 as noted above. Digital comparator 116 effects a comparison of signals 120, 124, or, more particularly, properties of signals 120, 124. In the embodiment of FIG. 1, comparator 116 makes a comparison of the respective frequencies of the first and second signals 120, 124 as will be described in greater detail with reference to FIG. 4 and from the comparison determines whether SoC 100 is operating in better than worst-case conditions, for example, the SoC is operating at above minimum operating voltage or frequency and/or below maximum ambient temperature or not. If SoC 100 is operating in better than worst-case conditions, then the voltage of the system on chip can be reduced thereby leading to energy savings. As noted, a property of second signal 124 is variable depending on the operating condition of the SoC. For instance, if the supply voltage of the SoC is reduced this will in turn have an impact on any components powered by that supply voltage. So, if second signal generator 106 (as noted, a ring oscillator in the embodiment of FIG. 1) is powered by that supply voltage, and that supply voltage is reduced, that will have an effect on the oscillation frequency of the ring oscillator, and it is these variations which are detected by digital logic controller 102 and the regulation trim word signal 132 can be output to regulate (or tune) the SoC voltage accordingly. However, it will be appreciated that in some instances, and depending on the operating condition of the SoC 100, it may be necessary to output the regulation trim word signal 132 to increase the voltage of the SoC 100.

Based on the result of the comparison, digital logic controller 102 determines whether or not to change the SoC voltage. If the voltage is to be changed, finite state machine 114 (or, to be more particular, the digital logic represented thereby) outputs from output 130 the regulation trim word signal 132 to input 134 of voltage regulator 108. Signal 132 controls the voltage regulator to generate the closed-loop feedback voltage to error amplifier 110 to regulate the voltage of the system on chip, such as the supply voltage Vdd, thereby to vary the voltage 152 supplying components on the SoC. The operation of voltage regulator 108, and the variation of the control signal 132 for that purpose, is described in more detail with reference to FIG. 5.

Thus it will be appreciated that FIG. 1 illustrates a digital logic controller 102 for regulating a voltage 152 of a system on chip 100. Digital logic controller 102 comprises a first input 118 for receiving a first signal 120, the first signal 120 being a reference signal and having a first property which is at least substantially constant over a range of operating conditions of the system on chip. Digital logic controller 102 also has a second input 122 for receiving a second signal 124, second signal 124 having a second property which is indicative of an operating condition of the system on chip, the second property being variable over the range of operating conditions of the system on chip. Digital comparator 116 compares the first property of first signal 120 and the second property of second signal 124 and, in dependence of the comparison, digital logic controller 102 outputs, via output 130, a regulation trim word signal 132 for regulating the voltage of the system on chip 100 at or near a target voltage a predetermined amount higher than a minimum operating voltage of the system on chip.

It will also be appreciated that FIG. 1 also illustrates a system on chip 100 comprising a first signal generator 104 for generating a first signal 120, the first signal being a reference signal and having a first property which is at least substantially constant over a range of operating conditions of the system on chip 100. Second signal generator 106 of SoC 100 generates a second signal 124 having a second property which is indicative of an operating condition of the system on chip 100, the second property being variable over the range of operating conditions of the system on chip 100. SoC 100 further comprises a voltage regulator 108 and a digital logic controller 102 which has: a first input 118 for receiving the first signal 120; a second input 122 for receiving the second signal 124; an output 130; and a digital comparator 116 for comparing the first property of first signal 120 and the second property of second signal 124. In dependence of the comparison, digital logic controller 102 outputs to voltage regulator 108, via output 130, a regulation (trim word) signal 132 for regulating the voltage of the system on chip 100 at or near a target voltage a predetermined amount higher than a minimum operating voltage of the system on chip.

Thus, implementation of these voltage regulation techniques allows realization of significant power savings by regulating the voltage of the SoC at an optimal operating voltage, for example above a minimum operating voltage. Thus, the voltage of the SoC can be reduced as low as possible in a dynamic fashion, i.e. "on-the-fly" while maintaining a safe margin above the minimum operating voltage of the SoC at which component error may occur thereby allowing the SoC to maintain critical path timing and achieve zero defect operation.

Figure 2:
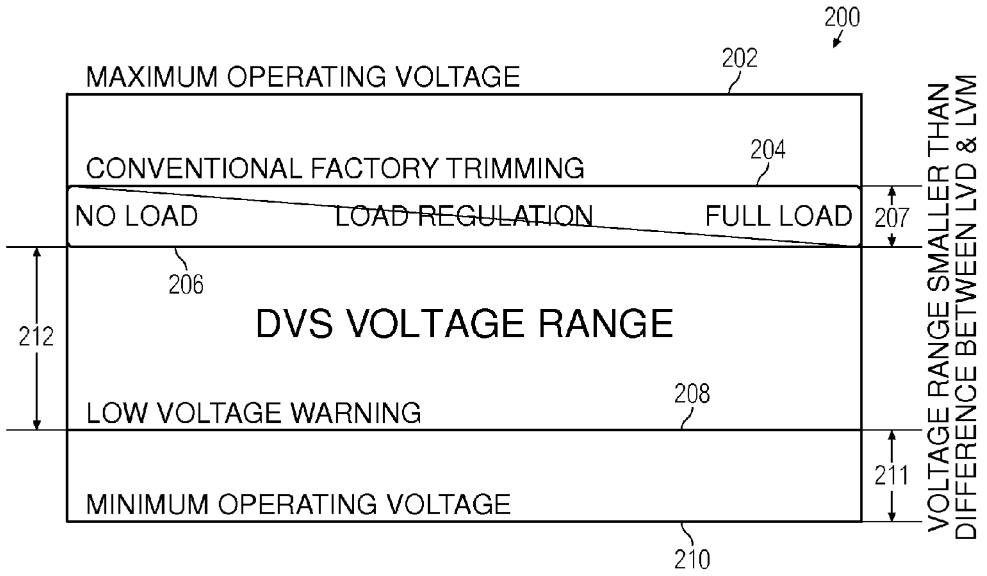
FIG. 2 is a graph of operating voltage between no-load and full-load conditions in a system on chip implementing the on-chip voltage regulation scheme of FIG. 1.

Referring now to FIG. 2, this illustrates a voltage-load graph illustrating voltage levels of the system on chip of FIG. 1. Note that the voltages illustrated are exemplary only and not limiting of the invention. Graph 200 illustrates the maximum operating voltage 202 of SoC 100 which is, typically, 1.32 V. The conventional factory trimming level 204 is, typically, 1.24V. This is the voltage of the system on chip under no-load conditions, and the "default" setting for the voltage regulator when the SoC initializes. Voltage level 206 is the level the SoC voltage drops across range 207 from no-load to full-load conditions, where the SoC has maximum activity/frequency. The low voltage warning level 208 is set, in this example, to 1.14 V, and is the target voltage at which the digital logic controller 102 is programmed to regulate the SoC voltage at or near to. This is considered to be a safe margin, i.e., a predetermined amount above the SoC minimum operating voltage 210 of 1.08 V. The safe margin is indicated by range 211. Therefore, between the full-load voltage 206 and the low voltage warning level 208 lies a range 212, across which the voltage regulation/trimming techniques described herein may be implemented. Given that the low voltage warning level 208 is significantly below the full-load voltage level 206, if SoC 100 operated without dynamic voltage scaling, then at any point of operation, the SoC voltage may be significantly higher than it needs to be to maintain critical path, thereby leading to unnecessary energy wastage. Thus, by regulating the voltage of the SoC 100 at or near the target voltage, low voltage warning level 208, significant energy savings may be realized.

When the voltage of SoC 100 is maintained at or near the low voltage warning level, this means that it is maintained precisely at the low voltage warning level or within an acceptable tolerance thereof. For instance, and as will be described in greater detail with reference to FIG. 4, the SoC voltage may be reduced until a low voltage warning alarm is detected when the SoC voltage is reduced to below the low voltage warning level of 1.14 V. Assuming that the reduction below the low voltage warning level alarm is within an acceptable tolerance (less than 5 mV in this example), the voltage may be maintained at that level without requiring to be raised precisely to the low voltage warning level of 1.14 V. Depending on the size of the "trim" steps (the size of the steps by which the regulated voltage may be changed) digital logic controller 102 may simply reduce the SoC voltage until it reaches precisely at the target voltage 208, the low voltage warning level. Thereafter, digital logic controller 102 determines that the optimal target voltage has been reached, wherein the DVS controller optimizes the voltage to a target operating voltage. This target operating voltage of LVW is a predetermined voltage threshold above the minimum operating voltage of the SoC. LVW levels are chosen to ensure that DVS voltage trimming circuit does not go below (or at least not significantly below) the LVW level voltage and protects the system from reaching close to minimum operating voltage limits. This is needed to account for internal voltage drops within the SoC and hence achieve a zero defect criteria especially for automotive applications.

As will also be described in more detail with reference to, in particular, FIG. 5, voltage regulator 108 operates to "trim" the voltage of SoC 100 incrementally in steps, responsive to the output of the regulation trim word signal 132 from digital logic controller 102. So, if the SoC voltage is trimmed down by one step, perhaps a step of 5 mV or so, it may take the SoC voltage below the low voltage warning level alarm, and that may be perfectly acceptable for continued operation of the SoC as this is still well above the minimum operating voltage of 1.08 V. A significant advantage from such an arrangement is that the trim steps may be set to be sufficiently small so that the digital logic controller 102 regulates the SoC voltage slowly towards the target voltage, thus avoiding drastic and sudden changes in SoC voltage, something critical for, for example, automotive zero-defect applications.

Thus, in this embodiment, the target voltage is set at a predetermined amount higher than the minimum operating voltage of the SoC.

The predetermined target voltage, the low voltage warning alarm point (LVW) should be chosen carefully. If the alarm point is set too high, this will reduce the benefits of power consumption reduction which the techniques disclosed herein may provide. On the other hand, setting the low voltage warning alarm point too low will increase the risk of the SoC voltage dropping to the minimum operating voltage level 210, which may cause functional failure from the voltage going too low.

In one implementation, the low voltage warning level 208 may be determined as being the minimum operating voltage 210 level plus the worst case voltage drop in the SoC due to peak current consumption, plus a level corresponding to one step in the voltage regulation change from the voltage regulator 108. For example, if the minimum operating voltage is 1.1 V, the worst case voltage drop in the SoC arising from peak current consumption is 50 mV and the voltage step change of the voltage regulator 108 is 10 mV, then the target voltage, the low voltage warning alarm level 208, should be set at 1.16 V to ensure that even if the voltage dips momentarily below the low voltage warning level 208, SoC operation is always maintained above the minimum operating voltage.

Figure 3:
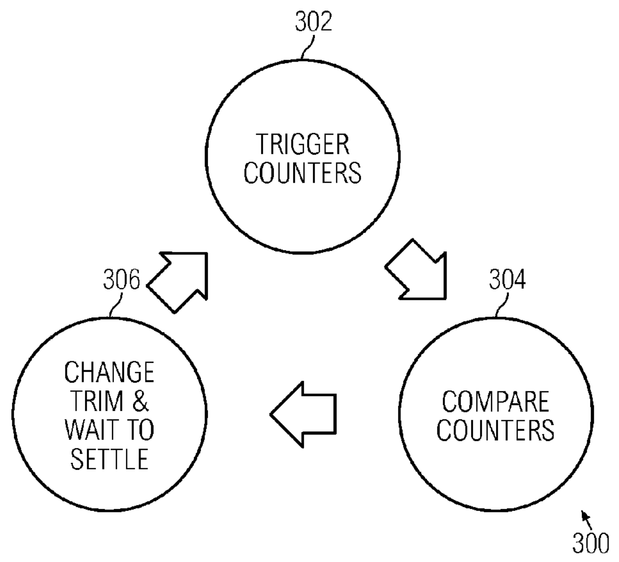
FIG. 3 is a state transition diagram illustrating the transition of principal states of the digital logic controller of FIG. 1.

FIG. 3 illustrates, in high-level, the transition of states of digital logic controller 102 when implementing the voltage regulation algorithm. The transition of states 300 includes a first state 302 in which counters are triggered as part of the comparison of the first and second signals mentioned above, and as described in more detail with reference to FIG. 4, before the counters are compared in state 304 to effect the comparison. In state 306, the digital logic controller applies, as appropriate, the voltage trim word regulation signal and waits for the SoC voltage to settle to the trimmed level prior to triggering the counters again at state 302. The algorithm loops around states 302, 304, 306 until the voltage regulation algorithm is interrupted when, for example, the digital voltage scaling algorithm is disabled, or the SoC operation mode changes from, say, RUN mode to a HALT/STOP/STANDBY mode. The length of time digital logic controller 102 waits may be tied into the response time of the error amplifier 110/voltage driver 112 combination, thereby avoiding unstable operation of the algorithm. A suitable response time of 5 μs may be used.

Figure 4:
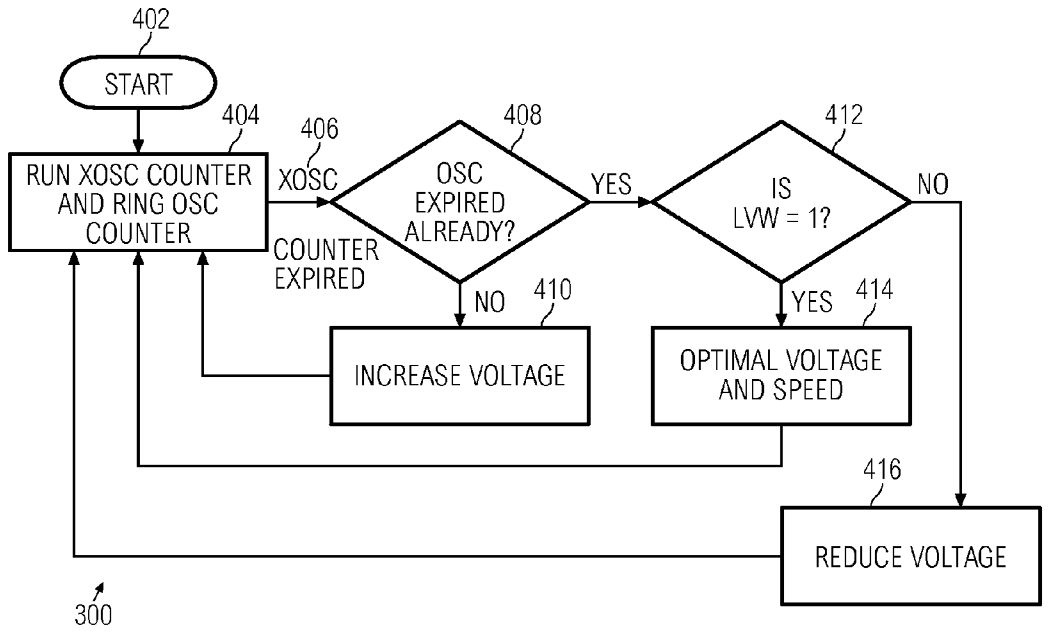
FIG. 4 is a second state transition diagram illustrating in more detail the transition between states of the digital logic controller of FIG. 1.

FIG. 4 provides a more detailed view of the transition of states of the digital logic controller 102 during implementation of the voltage regulation algorithm. In this illustration, the process 300 commences at step 402 and at step 404 a counter of the clock transitions of the crystal oscillator 104 is initiated. A counter of the clock transitions of the ring oscillator is also initiated at the same time. Ideally, these two counts are initiated simultaneously. Digital logic controller 102 detects 406 that the counter of the crystal oscillator clock transitions has expired. At step 408 digital logic controller 102 checks to determine whether the count of clock transitions of the ring oscillator has expired already at the time of expiry of the crystal oscillator counter. In this embodiment of the invention, this check is executed by digital comparator 116 which, thus, "compares" the first property of the first signal 120 (the first property of the first signal being the oscillation frequency of the crystal oscillator clock signal) with the second property of the second signal 124 (the second property of the second signal being the oscillation frequency of the ring oscillator clock signal). Dependent upon the result returned by digital comparator 116 at step 408, digital logic controller 102 determines whether or not SoC 100 is running fast, meaning that it has excess capacity/positive slack and that the SoC voltage can be reduced. That is, digital logic controller 102 is arranged to reduce the voltage of the system on chip 100 in dependence of determining from the comparison that the system on chip 100 is operating in a condition which is better than a poorest-acceptable operating condition. Digital logic controller 102 makes this determination by: receiving the first signal 120 derived from a first clock signal of crystal oscillator 104, the first property being a first frequency of first signal 120; and receiving the second signal 124 derived from a second clock signal of a ring oscillator 106, the second property being a second frequency of second signal 124. Digital comparator 116 compares the first frequency with the second frequency by determining which of a first count of transitions of the first signal and a second count of transitions of the second signal expires first. Digital logic controller 102 is configured to determine the first count has expired at a first count expiry time and to output the regulation signal 132 to regulate the voltage in dependence of whether the second count has expired at the first count expiry time. Whether the second count expires before or after the first count determines whether or how the voltage is to be regulated.

If digital logic controller 102 determines at step 408 that the count of the ring oscillator has not expired at the first count expiry time, digital logic controller 102 determines that the system on chip 100 is running slow and that critical path timing may not be met safely. That is, SoC 100 is not operating in a condition which is better than a poorest-acceptable operating condition and, thus, digital logic controller 102 must increase, i.e. trim up, the voltage level. Or to put it another way, digital logic controller 102 outputs the regulation trim word signal 132 to increase the voltage of the SoC if, at the first count expiry time, the second count has not expired. The DVS algorithm limits the voltage reduction to a predetermined voltage level or LVW at or near which voltage is kept constant. Also, when the operating conditions are poorer, the DVS algorithm can trim up the voltage until the digital comparator indicates the desired voltage level is reached.

Advantageously, the digital logic controller may also implement a high voltage warning so that the SoC voltage may not be trimmed up above a certain voltage level, such as the conventional factory trimming level 204. The upper operating voltage limit can be defined as HVW (High Voltage Warning) above which the trimming algorithm will stall. This is to protect the semiconductor devices from being subjected to voltage overstress and also to avoid timing violations like Hold time issues at higher voltages which can make the component fail in field products.

If the SoC voltage has been reduced below the low voltage warning level, digital logic controller 102 receives this indication from a voltage regulator LVW circuit (not illustrated). Digital logic controller 102 is able to measure the system voltage by virtue of voltage signal 128 input to digital logic controller 102 on input 126. Digital logic controller 126 monitors signal 128 and flags when the voltage drops below the low voltage warning level. In embodiments of the invention, it is desirable not to reduce the voltage any further if the low voltage warning alarm has already been flagged, and the digital logic controller 102 checks for this at step 412. If the voltage has already been reduced to the low voltage warning level, the voltage should not be reduced further towards the minimum operating voltage 210 of SoC 100 and digital logic controller 102 detects at step 414 that the optimal voltage and processing speed of SoC 100 have been reached and no change is to be effected.

If at step 412 digital logic controller 102 detects that the voltage has not been reduced below the low voltage warning level, the digital logic controller then reduces the voltage at step 416 and outputs the regulation trim word signal 132 to voltage regulator 108 to reduce the voltage. Thus, digital logic controller 102 is configured, from the determination (that the SoC is operating in a condition which is better than a poorest-acceptable operating condition), to reduce the voltage of the system on chip if the digital logic controller has not detected the voltage has been reduced to the target value. Digital logic controller 102 is therefore configured to reduce the voltage of the SoC until it detects the voltage has been reduced to the target value. Perhaps more specifically, the digital logic controller 102 is configured to output the regulation trim word signal 132 to reduce the voltage of the system on chip 100 if, at the first count expiry time, the second count has expired and the digital logic controller 102 has not detected the voltage has been reduced to the target value 208 of the low voltage warning alarm level.

It is not specifically illustrated in FIG. 4, but, in accordance with state 306 of FIG. 3, after trimming the voltage, digital logic controller 102 waits for the voltage to settle prior to triggering the counters again. Indeed, even if digital logic controller 102 detects that the voltage should not be changed at a particular iteration of the algorithm, as at step 414, the controller waits again prior to initiating the counters once more.

Thus, it will be appreciated that a method for regulating a voltage of a system on chip 100 has been described. The method comprises providing a digital logic controller 102 comprising: a first input 118; a second input 122; an output 130; and a digital comparator 116. The method further comprises receiving, at the first input 118 of digital logic controller 102 a first signal 120 generated by a first signal generator 104. The first signal is a reference signal and has a first property which is at least substantially constant over a range of operating conditions of the SoC. The method also comprises receiving, at the second input 122 of digital logic controller 102, a second signal 124 generated by a second signal generator 106. The second signal has a second property which is indicative of an operating condition of the system on chip 100. The second property is variable over the range of operating conditions of the system on chip. The method also comprises comparing, using the digital comparator 116, the first property of a first signal 120 and the second property of second signal 124. In dependence of the comparison, the method comprises trimming the voltage of the system on chip 100 at or near a target voltage 208 a predetermined amount higher than a minimum operating voltage of the system on chip by outputting, via the output 130 of digital logic controller 102, a regulation trim word signal 132 to a voltage regulator 108.

Figure 5:
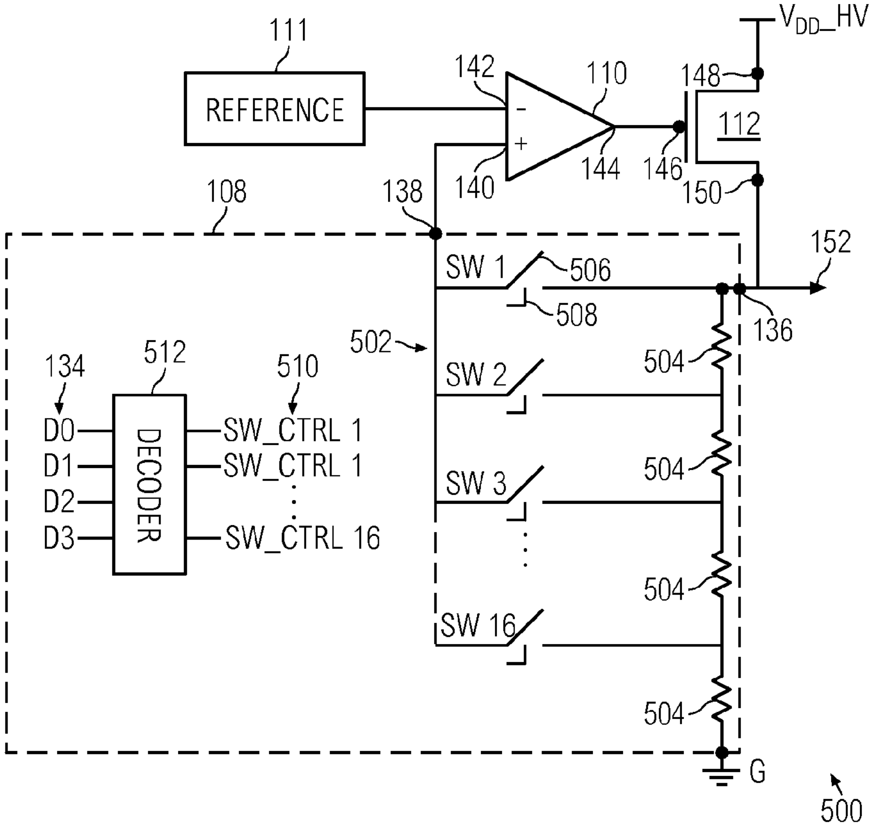
FIG. 5 is an electrical schematic diagram illustrating in detail the voltage regulator of FIG. 1.

FIG. 5 illustrates in more detail the voltage regulator 108 of FIG. 1. For the sake of clarity, FIG. 5 omits from view the digital logic controller and the signal generators. However, the reference generator 111, comparator/error amplifier 110 and MOSFET/voltage driver 112 are retained for a comprehensive discussion of the operation of voltage regulator 108.

Voltage regulator 108 operates in conjunction with error amplifier/comparator 110 and the voltage driver 112 to regulate the supply voltage Vdd to provide a regulated voltage 152 for the system on chip. As noted above, the regulated voltage 152 may be used to power components of system on chip 100 such as the sea of gates (not illustrated), and other components such as the second signal generator (ring oscillator) 106. Voltage regulator (trim controller) 108 comprises a resistor ladder 502 composed of resistors 504. Resistors 504 are switched in and out of the resistor ladder under control of the switches 506 which have control inputs 508 derived from the outputs 510 of decoder 512. Resistor ladder 502 is a reconfigurable voltage divider circuit, reconfigurable dependent upon the state of the switches 506. Decoder 512 receives, as its input, regulation trim word signal 132 from the digital logic controller 102 at input 134. In the embodiment of FIG. 5, regulation trim word signal 132 is a 4-bit digital signal for switching a total of 16 (i.e. 2 to the power 4 from the 4-bit digital input signal) resistors 504 in resistor ladder 502 via their corresponding switches 506. As described above, digital logic controller 102 outputs the 4-bit regulation trim word signal 132 to generate the feedback voltage for the closed loop of the error amplifier 110/voltage driver 112. Decoder 512 decodes that signal and outputs, at output 510, control signals for activating the switch controls 508 of the switches 506 dependent upon the desired operating voltage.

Thus the voltage regulator/trim controller is a selectable resistor divider network. The resistor divider consists of multiple switches that select one of the tap points on the resistor ladder, which generates a fraction of the regulated voltage 152. (By changing the resistor ladder tap point, the SoC voltage 152 can be set to any desired level, within the range of operation of the error amplifier 110/voltage driver 112, subject to the size of the trim steps, and the digital logic controller 102 specifies which level in that range the voltage is to be set to.) The input voltage to this resistor ladder is the regulated output voltage 152 from the voltage driver 112, and the output (fraction of voltage, ratio being that of resistor divider network) voltage is fed back to the error amplifier 110. The error amplifier compares this with the reference signal generated by reference signal generator 111 and adjusts the regulated voltage output to make this error zero.

Thus, the desired regulated voltage is controlled via a closed-loop feedback circuit and terminal 138 of voltage regulator 108 is connected to the non-inverting input 140 of error amplifier 110 with the reference signal being output by reference signal generator 111 and received at the inverting input 142 of comparator 110. The error amplifier is a standard inverting amplifier configuration made out of operational amplifier circuits (which is a well known basic analog circuit, well documented in literature).

Mathematically, assuming the resistor ladder has a ratio R, and the reference voltage is Vref, then the regulated output voltage, Vout 152 can be derived by equating the error to zero: $Vout*R=Vref$, or $Vout=Vref/R$ In the embodiment of FIG. 5, the reference signal generator 111 is a bandgap generator, an analog circuit that uses the fixed energy band property of silicon material, and using a circuit made out of transistors, generates a fixed voltage, that is used as reference in the error amplification. The error amplifier 110 is an operational amplifier configured as a comparator/difference amplifier that amplifies the difference between the signal generated by the bandgap generator 111 and the fed back voltage from the voltage regulator 108, output on terminal 138. The error amplifier is used to modulate the regulated voltage 152, in a negative feedback loop, such that the loop stabilizes when error becomes zero.

Figure 6:
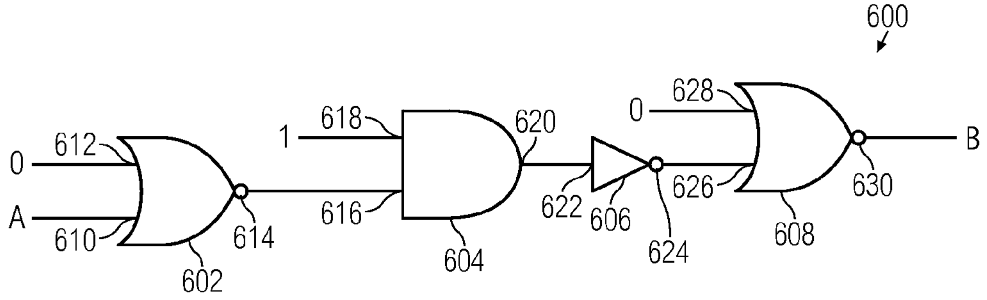
FIG. 6 is a digital logic diagram illustrating in detail one configuration for the second signal generator of FIG. 1.

As noted above with reference to FIG. 1, second signal generator 106 may, in embodiments, be a ring oscillator. As also noted above, the ring oscillator may be composed of components which make up the building blocks of the critical path of the SoC such as NOR and digital logic gates. One such exemplary ring oscillator is composed of a series 600 of digital logic gates as is illustrated in FIG. 6. Series 600 comprises of digital logic gates connected in series: a first NOR gate 602, an AND gate 604, a NOT gate 606 and a second NOR gate 608. As is conventional, ring oscillator circuits are typically composed of an odd-numbered series of NOT gates (not shown), each of which has an input (called, for the sake of convenience) "A" and an output (called again for convenience) "B". In the series of NOT gates, the signal on output B of the first NOT gate in the ring oscillator is supplied as an input A of the second NOT gate. The signal on output B of the second NOT gate, is supplied as an input A of the third NOT gate and so on. In the arrangement of FIG. 6, each of the NOT gates of a conventional ring oscillator is replaced by a series 600 of digital logic gates, where the input is A, and the output is B. Thus, a series 600 of digital logic gates of FIG. 6 comprises the "building blocks" of a ring oscillator which may be implemented as the second signal generator 106 of FIG. 1. An output B of one series 600 of gates is supplied as an input A of the next series 600 of gates, which substitutes the next NOT gate.

First NOR gate 602 has first and second inputs 610, 612. First input 610 receives its input signal A while second input 612 is held at a logical zero. Output 614 of NOR gate 602 is a first input 616 of AND gate 604. Second input 618 of AND gate 604 is held at a logical 1. Therefore output 620 of AND gate 604 is the input 622 of NOT gate 606, and the signal level is a logic zero when input 610 is a logical 1. Output 624 of NOT gate 606 is, of course, the inverse of input 622 and is a first input 626 of NOR gate 608. The second input 628 of NOR gate 608 is held at a logical zero. Output 630 of NOR gate 608 is the output B of one "building block" 600 of the ring oscillator.

While the series 600 of digital logic gates provides an overall inverting logic as with a NOT gate of a conventional ring oscillator, the ring oscillator thus consists of a ring of components which are also used as the "building blocks" of the SoC (in its control logic), in contrast with a conventional ring oscillator which typically consists only of a ring of NOT gates. Each of the "building blocks" is made up of the combinational logic of the critical path of the SoC (the timing path with least positive slack), such that the transfer function of this building block is logical inversion. Thus, in embodiments of the invention which implement ring oscillators implementing the building blocks of the type as illustrated in FIG. 6, it is possible to achieve a very good correlation with the critical path of the SoC across the range of operating characteristics of the SoC in addition to having the benefits of a conventional ring oscillator.

The "inverting building block" is connected (in an odd number of gates) serially to mimic the critical path of the SoC. The final output B gets fed back to the input A of the first stage to form an inverting closed loop, which results in a clock output from the ring oscillator.

Going back to FIG. 1, it will be recalled that the digital logic controller 102 also comprises a memory 117. In the embodiment of FIG. 1, memory 117 is a memory register for storing settings and/or values for the regulation trim word signal 132, but other types of memory may also be utilized. Provision of such a memory register is particularly beneficial as digital logic controller 102 may retain, for example, a last setting/value of the regulation trim word signal. Therefore, when the implementation of the DVS algorithm is suspended/disabled, this last value is retained in a memory register 117 for digital logic controller 102 to use when the operation of the DVS algorithm is restarted/resumed.

At SoC power up, the DVS algorithm will start from the "factory trim setting" level 204 FIG. 2, which is usually between, for example, 1.24V to 1.26V. Subsequently, the DVS algorithm will regulate the voltage 152 as described above, until it reaches the target voltage. Many SoCs will have a RUN duty cycle of, say, 10 ms in every 100 ms (for the remaining 90 ms the SoC remaining in low power state). Now, the process of reaching the target optimal voltage takes a relatively long time, of the order of 1 ms, a relatively sizable percentage of the RUN time of the duty cycle, around 10%. So, to save this time, the trim setting for the optimal target voltage is stored in memory 117, and may constantly be updated as the trim setting is varied, such that when the RUN duty cycle of the SoC is terminated, the last regulation trim word is retained in the memory, to be reused when the DVS algorithm is restarted. The digital logic controller 102 can be configured to enable the digital voltage scaling algorithm only during RUN mode, to avoid very sharp changes in load when moving between SoC operational modes (RUN, STOP, STANDBY), and is later restarted (for example the SoC is cycled through RUN mode to STOP mode and back to RUN mode). Then digital logic controller 102 simply picks up from the last value of the trim settings saved in memory 117, rather than have to again go to the factory trim level 204 and regulate the voltage to the target voltage. The process of a particular SoC is fixed, it being decided during manufacturing/design. Voltage is the controlled variable here, and only temperature changes can cause potential problems. However, imagine that for some reason, the temperature became adverse—for example, well above normal ambient temperature—in the intervening period between when the RUN mode of the SoC is suspended and then restarted, so that the voltage drops to lower than the low voltage warning level 208. However, this will be quickly corrected by the DVS algorithm back to a new trim setting that will trim the SoC voltage 152 back to the optimal, target voltage; refer, for example, to steps 408, 410 of FIG. 4, described above. However, in this way the target voltage can be achieved more quickly than starting from the conventional factory trim level 204. Thus, when implementing memory register 117 to retain the last value of the regulation signal, the last trim setting for the voltage regulator, digital logic controller 102 must spend the relatively long time period in achieving the target voltage from the conventional factory trim level only upon first power-up, and the DVS algorithm is active, at or near the target voltage for the majority of the RUN duty cycle of the SoC.

In such embodiments, it will be appreciated that the digital logic controller 102 further comprises a voltage regulation memory 117 for storing a last value (setting) of regulation trim word signal 132 at a time when DVS algorithm of the system on chip 100 is suspended/terminated. Upon re-commencement of DVS algorithm, digital logic controller 102 retrieves the last value from the voltage regulation trim word memory 117 and sets the regulation trim word signal 132 to the last value.

By now it should be appreciated that there has been provided a novel method of regulating a voltage of a system on chip by trimming the voltage dependent upon a determination of an operating condition of the SoC. Although the techniques described above have particular implementation in mobile environments, e.g. where electronic components derive their power supply from a battery, and also in automotive environments requiring a robust DVS algorithm, the invention may be implemented into any SoC application which would benefit from reduced power consumption.

Beneficially, the voltage regulator always remains in closed-loop control, which helps to obviate the requirement of a lookup table, and the expenditure associated therewith.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A digital logic controller for regulating a voltage of a system on chip, the digital logic controller comprising:

a first input for receiving a first signal, the first signal being a reference signal and having a first property that is at least substantially constant over a range of operating conditions of the system on chip;

a second input for receiving a second signal, the second signal having a second property that is indicative of an operating condition of the system on chip, the second property being variable over the range of operating conditions of the system on chip;

an output; and a comparator for comparing the first property of the first signal and the second property of the second signal, wherein based on the comparison, the digital logic controller outputs to a voltage regulator, via the output, a regulation signal for regulating the voltage of the system on chip at or near a target voltage a predetermined amount higher than a minimum operating voltage of the system on chip, wherein the predetermined amount includes a worst case voltage drop in the System on chip due to peak current consumption.

2. The digital logic controller of claim 1, wherein the digital logic controller reduces the voltage of the system on chip, based on the comparison when the system on chip is operating in a condition that is better than a poorest-acceptable operating condition.

3. The digital logic controller of claim 2, wherein the digital logic controller, based on the determination, reduces the voltage of the system on chip if the digital logic controller has not detected the voltage has been reduced to the target value.

4. The digital logic controller of claim 3, wherein the digital logic controller reduces the voltage of the system on chip until the digital logic controller detects the voltage has been reduced to the target value.

5. The digital logic controller of claim 1, wherein the digital logic controller increases the voltage of the system on chip in dependence of determining from the comparison that the system on chip is not operating in a condition that is better than a poorest-acceptable operating condition.

6. The digital logic controller of claim 1, wherein:

the first signal is derived from a first clock signal of a crystal oscillator, and the first property is a first frequency of the first signal;

the second signal is derived from a second clock signal of a ring oscillator, and the second property is a second frequency of the second signal; and the comparator compares the first frequency with the second frequency by determining which of a first count of transitions of the first signal and a second count of transitions of the second signal reaches a predetermined count first.

7. The digital logic controller of claim 6, wherein the digital logic controller determines the first count has reached the predetermined count at a first count expiry time and outputs the regulation signal to regulate the voltage based on whether the second count has reached the predetermined count at the first count expiry time.

8. The digital logic controller of claim 7, wherein the digital logic controller outputs the regulation signal to reduce the voltage of the system on chip if, at the first count expiry time, the second count has reached the predetermined count and the digital logic controller has not detected the voltage has been reduced to the target value.

9. The digital logic controller of claim 7, wherein the digital logic controller outputs the regulation signal to increase the voltage of the system on chip if, at the first count expiry time, the second count has not reached the predetermined count.

10. The digital logic controller of claim 1, further comprising a voltage regulation memory for storing a last value of the regulation signal at a time when regulation of the voltage of the system on chip is suspended, and wherein the digital logic controller, upon re-commencement of regulation of the voltage of the system on chip, retrieves the last value from the voltage regulation memory and sets the regulation signal to the last value.

11. A system on chip (SoC), comprising:

a first signal generator for generating a first signal, the first signal being a reference signal and having a first property that is at least substantially constant over a range of operating conditions of the system on chip;

a second signal generator for generating a second signal having a second property that is indicative of an operating condition of the system on chip, the second property being variable over the range of operating conditions of the system on chip;

a voltage regulator; and a digital logic controller comprising:

a first input for receiving the first signal;

a second input for receiving the second signal;

an output; and a comparator for comparing the first property of the first signal and the second property of the second signal, wherein based on the comparison, the digital logic controller outputs to the voltage regulator, via the output, a regulation signal for regulating the voltage of the system on chip at or near a target voltage that is a predetermined amount higher than a minimum operating voltage of the system on chip, wherein the predetermined amount includes a worst case voltage drop in the SoC due to peak current consumption.

12. The system on chip of claim 11, wherein the digital logic controller is configured to reduce the voltage of the system on chip in dependence of determining from the comparison that the system on chip is operating in a condition which is better than a poorest-acceptable operating condition.

13. The system on chip of claim 12, wherein the digital logic controller is configured, from the determination, to reduce the voltage of the system on chip if the digital logic controller has not detected the voltage has been reduced to the target value.

14. The system on chip of claim 13, wherein the digital logic controller is configured to reduce the voltage of the system on chip until detecting the voltage has been reduced to the target value.

15. The system on chip of claim 11, wherein the digital logic controller is configured to increase the voltage of the system on chip in dependence of determining from the comparison that the system on chip is not operating in a condition which is better than a poorest-acceptable operating condition.

16. The system on chip of claim 11, wherein:

the first signal is derived from a first clock signal of a crystal oscillator, and the first property is a first frequency of the first signal;

the second signal is derived from a second clock signal of a ring oscillator, and the second property is a second frequency of the second signal; and the comparator is configured to compare the first frequency with the second frequency by determining which of a first count of transitions of the first signal and a second count of transitions of the second signal reaches a predetermined count first.

17. The system on chip of claim 16, wherein the digital logic controller is configured to determine the first count has reached the predetermined count at a first count expiry time and to output the regulation signal to regulate the voltage in dependence of whether the second count has reached the predetermined count at the first count expiry time.

18. The system on chip of claim 17, wherein the digital logic controller is configured to output the regulation signal to reduce the voltage of the system on chip if, at the first count expiry time, the second count has reached the predetermined count and the digital logic controller has not detected the voltage has been reduced to the target value.

19. The system on chip of claim 11, further comprising a voltage regulation memory for storing a last value of the regulation signal at a time when regulation of the voltage of the system on chip is suspended, the digital logic controller being configured, upon re-commencement of regulation of the voltage of the system on chip, to retrieve the last value from the voltage regulation memory and to set the regulation signal to the last value.

20. A method for regulating a voltage of a system on chip, the method comprising:

providing a digital logic controller comprising:

a first input;

a second input;

an output; and a comparator;

receiving, at the first input of the digital logic controller, a first signal generated by a first signal generator, the first signal being a reference signal and having a first property which is at least substantially constant over a range of operating conditions of the system on chip;

receiving, at the second input of the digital logic controller, a second signal generated by a second signal generator, the second signal having a second property which is indicative of an operating condition of the system on chip, the second property being variable over the range of operating conditions of the system on chip;

comparing, using the comparator, the first property of the first signal and the second property of the second signal; and in dependence of the comparison, regulating the voltage of the system on chip at or near a target voltage a predetermined amount higher than a minimum operating voltage of the system on chip by outputting, via the output of the digital logic controller, a regulation signal to a voltage regulator, wherein the predetermined amount includes a worst case voltage drop in the system on chip due to peak current consumption.

* * * * *